(12) United States Patent
Freund et al.

(10) Patent No.: US 7,594,356 B2
(45) Date of Patent: Sep. 29, 2009

(54) AGRICULTURAL PRODUCTS DEVELOPED FROM MANURE

(76) Inventors: Matthew R. Freund, 324 Canaan-Norfolk Rd., East Canaan, CT (US) 06024; Benjamin J. Freund, 324 Canaan-Norfolk Rd., East Canaan, CT (US) 06024

( * ) Notice: Subject to any disclaimer, the term of this patent is extended or adjusted under 35 U.S.C. 154(b) by 79 days.

(21) Appl. No.: 10/867,228

(22) Filed: Jun. 14, 2004

(65) Prior Publication Data

US 2005/0274075 A1 Dec. 15, 2005

(51) Int. Cl.
*A01G 9/02* (2006.01)
(52) U.S. Cl. .................................... 47/65.7
(58) Field of Classification Search ............ 47/74, 47/65.5, 65.7, 73, 77
See application file for complete search history.

(56) References Cited

U.S. PATENT DOCUMENTS

| | | | | |
|---|---|---|---|---|
| 193,908 A | * | 8/1877 | Alt | 47/74 |
| 1,931,248 A | * | 10/1933 | Bryant | 47/9 |
| 2,094,513 A | * | 9/1937 | Wilson et al. | 47/74 |
| 2,132,837 A | * | 10/1938 | Talbot | 210/180 |
| 2,202,772 A | * | 5/1940 | Durdin, Jr. | 210/603 |
| 2,313,434 A | * | 3/1943 | Grether | 71/10 |
| 3,102,364 A | * | 9/1963 | Pullen | 47/74 |
| 3,372,018 A | * | 3/1968 | Stocker et al. | 71/21 |
| 3,535,236 A | * | 10/1970 | Travis | 210/136 |
| 3,877,920 A | * | 4/1975 | Carlberg | 71/21 |
| 3,923,729 A | * | 12/1975 | Clendinning et al. | 47/74 |
| 6,490,827 B2 | * | 12/2002 | Hasegawa et al. | 47/65.7 |
| 2003/0041516 A1 | * | 3/2003 | Cook | 47/65.7 |

FOREIGN PATENT DOCUMENTS

AU 9176372 * 11/1991

* cited by examiner

*Primary Examiner*—Francis T Palo
(74) *Attorney, Agent, or Firm*—Bachman & LaPointe, P.C.

(57) ABSTRACT

A process for developing agricultural products, such as seed pots, from manure includes the steps of collecting the manure, modifying nutrient content and fiber content of the manure, optionally separating at least part of a solid portion of the manure containing nutrients and fibers from a liquid portion, preparing the separated solid portion or the unseparated manure for molding, and molding the separated solid portion or the unseparated manure into a desired product. Following the molding step, the desired product may be subjected to a drying step. A system for performing the process is described.

20 Claims, 2 Drawing Sheets

AGRICULTURAL PRODUCTS DEVELOPED FROM MANURE

BACKGROUND OF THE INVENTION (1) Field of the Invention

The present invention relates to a seedling pot which is formed from manure and to a process for forming the pot.

(2) Prior Art

One of the problems facing all farms with manure producing live stock is the processing and distribution of nutrients in manure. Based on today's environmental regulations, the more widespread is the return of nutrients to the earth, the better.

SUMMARY OF THE INVENTION

Accordingly, it is an object of the present invention to provide agricultural products developed from manure which broaden the distribution and use of soil nutrients that are naturally concentrated in manure.

It is a further object of the present invention to provide a process for developing agricultural products from manure.

The foregoing objects are attained by the present invention.

In accordance with the present invention, a process for developing agricultural products from manure broadly comprises the steps of collecting said manure, modifying nutrient content and fiber content of said manure, separating at least part of a solid portion of said manure containing nutrients and fibers from a liquid portion, preparing said separated solid portion for molding, and molding said separated solid portion into a desired product. Following the molding step, the desired product is subjected to a drying step. In a preferred embodiment of the present invention, the molded product is a seedling pot.

In accordance with another aspect of the present invention, a system for developing agricultural products from manure is provided. The system broadly comprises means for collecting said manure, means for modifying nutrient content and fiber content of said manure, means for separating a solid portion of said manure containing nutrients and fibers from a liquid portion, means for preparing said separated solid portion for molding, and means for molding said separated solid portion into a desired product. The system may further comprise means for drying the molded products.

Other details of the agriculture products developed from manure of the present invention, as well as other objects and advantages attendant thereto, are set forth in the following detailed description and the accompanying drawing wherein like reference numeral depict like elements.

DETAILED DESCRIPTION OF THE PREFERRED EMBODIMENT(S)

Most conventional dairy farms or farms which have other types of animals generate a manure waste stream. The manure in the waste stream has useful nutrients within it which when recovered can be recycled. Accordingly, the present invention relates to the recovery and use of these nutrients in agricultural products.

Figure 1:
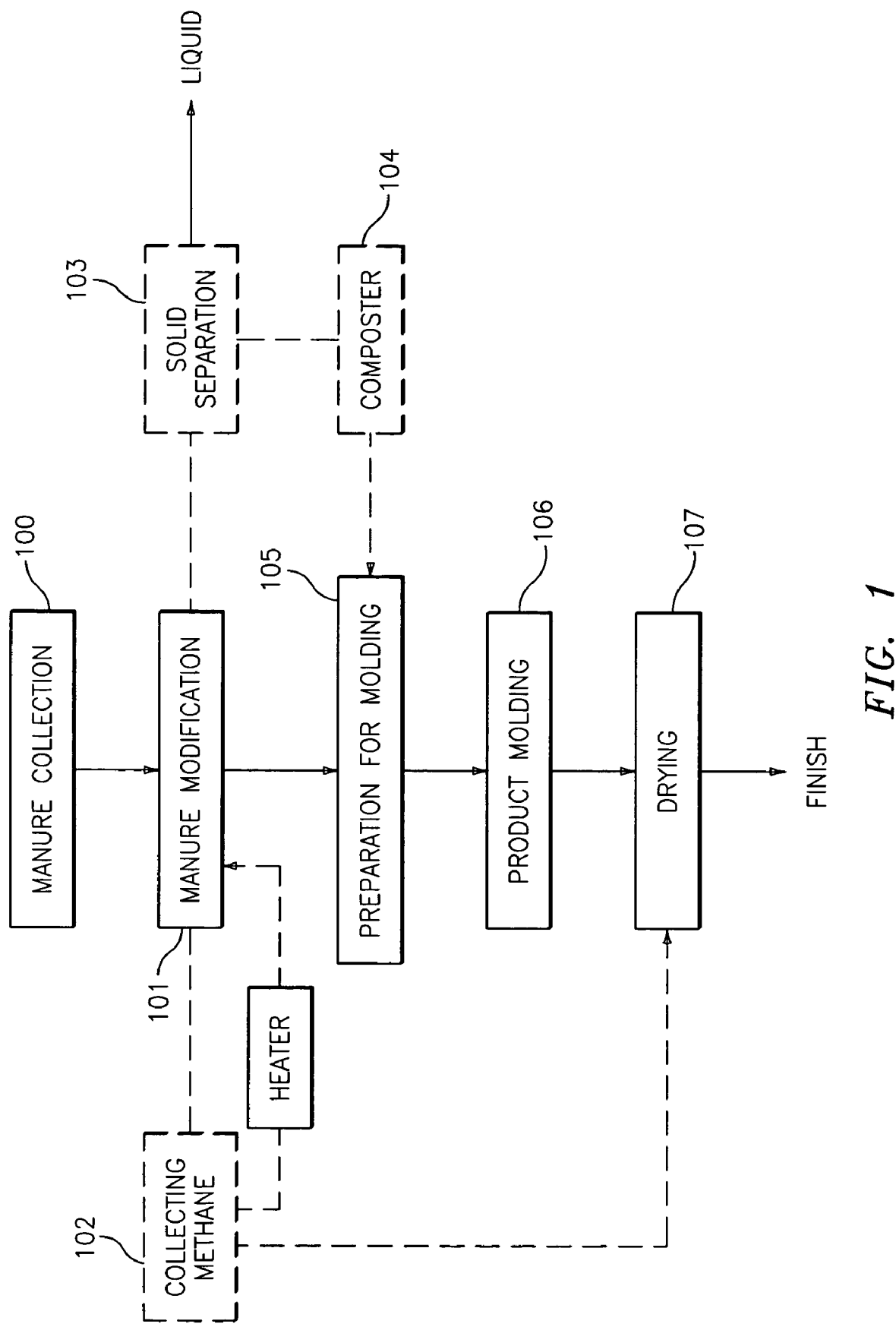
FIG. 1 is a flow chart illustrating a process for developing agricultural products from manure in accordance with the present invention.
Figure 2:
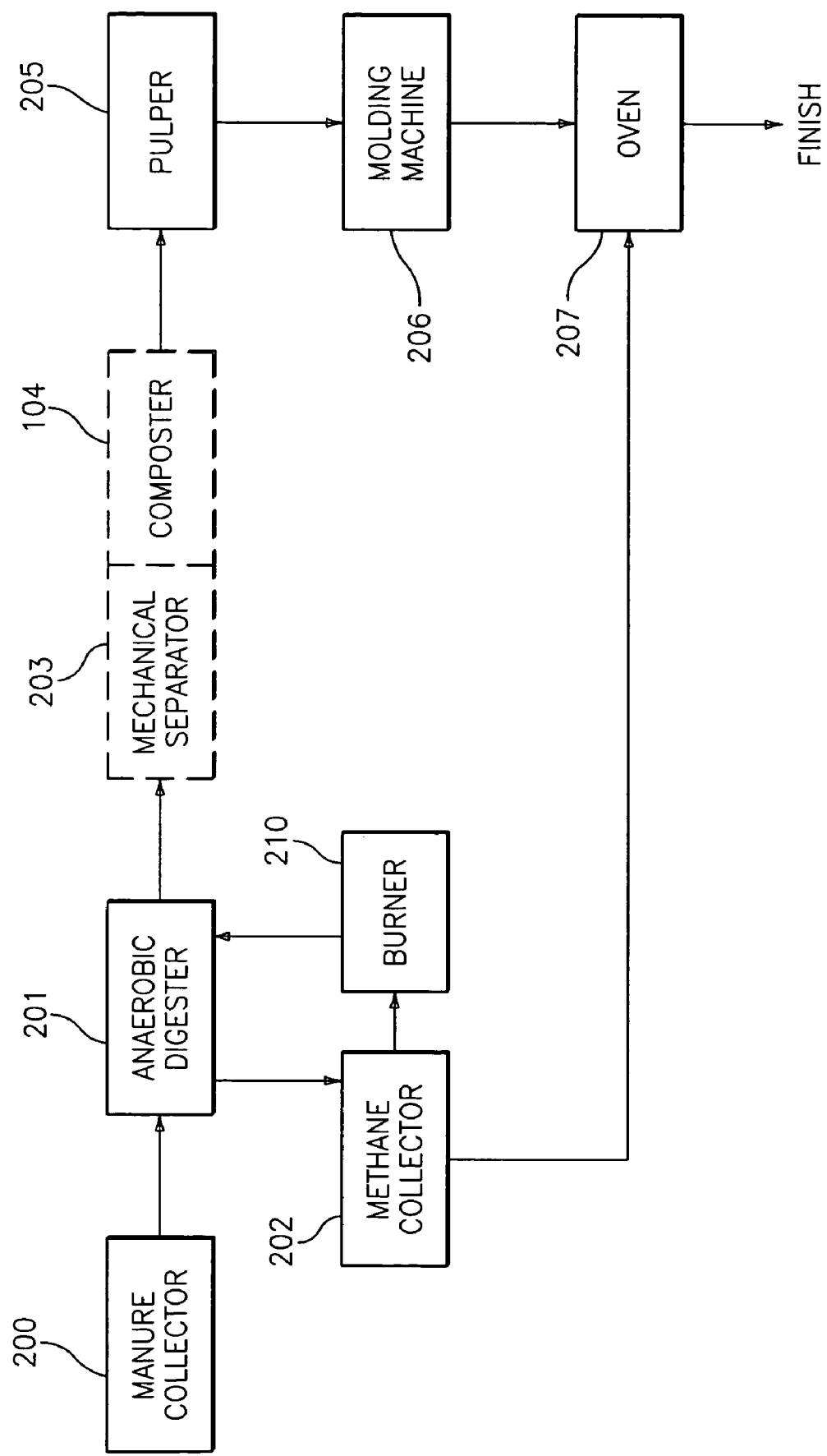
FIG. 2 is a schematic representation of a system for developing agricultural products from manure.

Referring now to FIGS. 1 and 2, in accordance with the present invention, manure may be collected in a first step 100 using any suitable means 200 known in the art. The collected manure in a step 101 may be conditioned or modified in an anaerobic digester 201 where methane gas may be captured as shown in step 102 and may be collected in a collector 202. If desired, the methane gas so captured may be used and burned for energy on the farm.

The anaerobic digester 201 used in the process of the present invention may be made out of any suitable material known in the art including, but not limited to, concrete, steel, brick, and/or plastic. The digester 201 may have any suitable shape such as like a silo, a trough, a basin or a pond, and may be placed either underground or on the surface. The design of the digester 201 preferably incorporates a pre-mixing area or tank, a digester vessel, a system for using the biogas, and a system for distributing or spreading the effluent (the remaining digested material).

The digester 201 may be a batch digester or a continuous digester. Batch type digesters consist of loading the digester with organic materials and allowing the materials to be digested. The retention time in this type of digester depends on temperature and other factors. Once the digestion is complete, the effluent is removed and the process is repeated.

In a continuous digester, organic material is constantly or regularly fed into the digester. The material moves through the digester either mechanically or by the force of the new feed of organic material pushing out digested material. Unlike batch type digesters, continuous digesters produce biogas without the interruption of loading material and unloading effluent. There are three types of continuous digesters which may be used in the process of the present invention. They are a vertical tank system, a horizontal tank or plug-flow system, and a multiple tank system.

In a preferred embodiment of the present invention, a continuous plug-flow anaerobic digester is used to condition the manure. Residence time of the manure in the digester may be on the order of at least 15 days, preferably 20-32 days. If desired, the manure residence time may be up to 40 days. The temperature during the digestion process is preferably maintained in the mesophilic range of approximately 100 degrees Fahrenheit. The temperature may be maintained by collecting and burning the methane gas in a burner 210 generated by the digestion process. Any excess methane gas, as previously mentioned, may be used for other heating purposes on the farm including, but not limited to, providing the drying energy needed to produce a molded product such as a molded fiber seed pot.

Anaerobic decomposition in a digester is a complex process. It occurs in three basic stages as a result of the activity of a variety of microorganisms. Initially, a group of microorganisms converts the organic material to a form that a second group of organisms utilizes to form organic acids. Methane-producing (methanogenic) anaerobic bacteria utilize these acids and complete the decomposition process. A variety of factors affect the rate of digestion and gas production. The most important is temperature. Anaerobic bacteria communities can endure temperatures ranging from below freezing to above 135 degrees Fahrenheit, but they thrive best at temperatures in the range of from about 98 degrees Fahrenheit (mesophilic) to 130 degrees Fahrenheit (thermophilic). Mesophilic bacteria activity, and thus biogas production, falls off significantly between about 103 degrees and 125 degrees Fahrenheit and gradually from 95 degrees to 32 degrees Fahrenheit. Thermophilic activity has different temperature characteristics.

In the thermophilic range, decomposition and biogas production occur more rapidly than in the mesophilic range. However, the process is highly sensitive to disturbances such as changes in feed materials or temperature. While all anaerobic digesters reduce the visibility of weed seeds and disease producing (pathogenic) organisms, the higher temperatures of thermophilic digestion result in more complete destruction. Although digesters operated in the mesophilic range must be larger to accommodate a longer period of decomposition within the tank (residence time), the process is less sensitive to upset or change in operating regimen. This is believed to be important in maintaining solid discharge material with consistent characteristics. It is also believed that the thermophilic digestion significantly reduces the quality of the fibers that survive the digestion process.

To optimize the digestion process, the digester 201 should be kept at a consistent temperature, as rapid changes will upset bacterial activity. In most areas of the United States, digestion vessels require some level of insulation and/or heating in order to maintain the temperature. In some installations, coolant from the biogas-powered engines is circulated in, or around, the digester to keep it warm, while other systems, burn part of the biogas in a boiler to indirectly heat the digester contents. In a properly designed system, heating generally results in an increase in biogas production during colder periods. The trade-offs in maintaining optimum digester temperatures to maximize gas production while minimizing expenses are somewhat complex. Studies on digesters in the north-central areas of the country indicate that maximum net biogas production can occur in digesters maintained at temperatures as low as 72 degrees Fahrenheit.

Other factors affect the rate and amount of biogas output. These include pH, which preferably are in the range of 7.0 to 7.4, water/solids ratio, where discharge solids typically run from 3.0 to 8.0% and feed solids are higher in the 12 to 15%, carbon/nitrogen ratio, mixing of the digesting material, the particle size of the material being digested and retention time. Pre-sizing and mixing of the feed material for a uniform consistency allows the bacteria to work more quickly. The pH is self-regulating in most cases. Bicarbonate of soda or hydrated lime can be added to maintain a consistent pH, for example when too much "green" or material high in nitrogen content is added. It may be necessary to add water to the feed material if it is too dry, or if the nitrogen content is very high. A carbon/nitrogen ratio of 20:1 to 30:1 appears to be best. Occasional mixing or agitation of the digesting material can aid the digestion process. The mixing or agitation may be carried out using any suitable means known in the art. Antibiotics in livestock feed have been known to kill the anaerobic bacteria in digesters. Complete digestion, and retention times, depend on all of the above factors.

The material drawn from the digester is called "sludge" or "effluent" and this is the material for which a use has been found. It is rich in nutrients (ammonia, phosphorous, potassium, and more than a dozen trace elements) and is an excellent soil conditioner. It can also be used as a livestock feed additive or livestock bedding material when dried. Any toxic compounds (pesticides, etc.) that are in the digester feedstock material may become concentrated in the effluent. Therefore, the effluent should be tested before using it on a large scale so as to carefully control what is done in the management of the herd. Controlling the consistency of the character of the sludge stream from the digester is key to the success of using the material to produce other products.

Methane is a gas that contains molecules of methane with one atom of carbon and four atoms of hydrogen. It is the major component of the "natural" gas used in many homes for cooking and heating. It is odorless, colorless, and yields about 1,000 BTUs of heat energy when burned.

Anaerobic bacteria are some of the oldest forms of life on earth. They evolved before the photosynthesis of green plants released large quantities of oxygen into the atmosphere. Anaerobic bacteria break down or "digest" organic material in the absence of oxygen and produce "biogas" as a waste product. Anaerobic decomposition occurs naturally in swamps, water-logged soils, rice fields, deep bodies of water, and in the digestive system of termites and large animals. Anaerobic processes can be managed in a digester or a covered lagoon (a pond used to store manure) for waste treatment. The primary benefits of anaerobic digestion are nutrient recycling, waste treatment, and odor control. Except in very large systems, biogas production is a highly useful but secondary benefit.

Biogas produced in anaerobic digesters consists of methane (50 vol % to 80 vol %), carbon dioxide (20 vol % to 50 vol %) and trace levels of other gases such as hydrogen, carbon monoxide, nitrogen, oxygen, and hydrogen sulfide. The relative percentage of these gases in biogas depends on the feed material and management of the process. When burned, a cubic foot of biogas yields about 10 BTUs of heat energy per percentage of methane composition. For example, biogas composed of 65 vol % methane yields 650 BTUs per cubic foot.

If desired, at times the manure slurry may be used directly without a separation process, especially when forming a second ply. However, as shown in step 103, the discharge from the digester 201 may be run through a separator 203 to separate at least part of the solid content from liquid content. Some portion of the solids may be separated or all the solids may be separated for use in forming all or part of a desired product. The separator 203 may comprise any suitable separator known in the art. Preferably, the separator 203 is a mechanical separator such as a decreasing pitch-dewatering auger. The agricultural products which are developed in accordance with the present invention typically come from the separated solid content. In the process of the present invention, the separated liquid content may be disposed of in any suitable manner known in the art.

The solids in the digester slurry discharge can be classified into two groups, fiber and granular. In the separation process, there is a high efficiency recovery of the fiber.

If desired, the dewatered solid material may be run through an "in-vessel" composter 104 to change the characteristics of the fibers in the solids where the fiber bundles are further weakened making it easier for the mechanical pulper to separate the fiber into smaller bundles or even single fibers.

It has been found that manure, in a slurry form, or the solid material which has been separated, may be used as shown in step 105 to form agricultural products such as molded pulp seed pots. It has been found that such pots have an inherent advantage over other recycled products, such as recycled newspaper products, in the growing end of the agricultural food chain because of their substantially ink free biodegradable nature and the natural nutrient value they provide that can not be found in any other product. It has been found that by controlling manure characteristics by using the anaerobic digestion process prior to manufacture of the pots, that the nature of the nutrients is changed in a manner that measurably enhances plant performance during early stages of development and leads to shorter periods of time from planting to mature harvest.

The pots of interest may be formed using any suitable pulp molding technique known in the art. Preferably, a type 2-pulp molding machine 205 is used to form the pots. The type 2 molding is desired because it offers the lowest cost equipment and can work with wider variations in pulp quality. The pulp may be formed using approximately 15 wt %-20 wt % recycled news print or corrugated cardboard and the remainder digested manure fiber. If desired, other fiber sources such as flax, coconut fiber, coffee grounds, etc., may be added to the pulp.

The materials forming the pulp may be fed into the pulping machine 205 and mixed with water so that the materials are from 0.5 vol % to 7.0 vol %. If a two layer product is to be formed, then the materials forming the first layer are preferably from 0.5 vol % to 2.5 vol %, while the materials forming the second layer are present in the range of from 0.5 vol % to 4.0 vol %. Inside, the combination of materials will be reduced to small pieces such as by a mechanical wheel which applies mechanical work to the liquid and its contents. In such a device, cavitation occurs at the interface of the wheel imparting significant shearing forces on the liquid and its contents. The wheel may have a diameter on the order of 36 inches and rotate at a speed of about 300 RPM. The pulper 205 untangles as many fibers as possible without breaking them and separates as many natural fiber bundles as possible without breaking the fibers into shorter lengths Next, a sizing agent may be added, such as starch based binder, a solid wax or a wax emulsion, or rosin, such as AKD(alkylketene dimer) along with aluminum sulfate to provide for sufficient wet strength during use. When added, the starch binder may be added at a concentration of 1.0% to 2.0% by weight of solids in the pulp. When added, rosin may be added at a concentration of 0.1% to 1.0% and Aluminum sulfate at a concentration of 1.0% to 3.0%. When added, the natural waxes may be added at concentrations of 0.5% to 2.0% by weight of solids in the pulp. Also, different methods and concentrations may be used in each of the separate plies.

A second method to impart wet strength to the seed pot for green house use may be by the direct application of a wax emulsion spray bath before removal from the forming die and/or the transfer die or by direct application of a wax to the partially dried or fully dried pot after removal from the forming machine.

For the proposed application, the molded seed pot must be able to structurally withstand being moist with occasional water flow through for weeks. Additionally, it must be able to withstand handling for replanting at the end of the nursery cycle. To this end, the pulp mixture may undergo a final screening and if needed, additional water will be added to bring it to the correct consistency for the molding process.

To achieve the desired product shape, as shown in step 106, a molding machine 206 is utilized to form the product. Preferably, the molding machine 206 has a mold which is of the type which enables water to be removed as the part or product is being formed. A fine screen may be used to give each molded part a semi-smooth finish on the outside. The inside may have a rougher surface similar to the interior of pulp molded egg cartons. A double screen mold may be preferred because it allows for higher vacuum values in the range of 15 to 20 inches Hg to be used without plugging forming screen opening. Alternatively, a multiple step forming process can be used that will lay down multiple plies of material with different freeness values allowing for the forming of a natural filter layer on the screen that will accommodate the characteristics of the next pulp layer.

This results in better forming cycle times in the range of 0.2 seconds to 4.0 seconds for each ply of a molded product.

The molding machine 206 preferably draws the pulp around the mold via the application of the vacuum, thus creating the desired thickness and strength as the water is removed. Water removal may be done by a gas/liquid mechanical separator in the line from the molding machine to vacuum pump. One may use a vacuum and/or heat on the receiving die, the one that takes the formed pots off the forming die. One may also use a mechanical pressing of the part on the forming die using the receiving die before transfer to further remove water from the molded product to improve strength for handling to the drying oven.

When the molded "pot" is dry enough to support its own weight, it is transferred to an oven 207, as shown in step 107, where the drying process, substantially reduces the weight. The oven 207 may be any suitable conventional drying oven known in the art. Typically, the molded pots would be dried for 30 minutes at a temperature of 140 degrees Fahrenheit in an air atmosphere. The drying temperature and the drying time may be varied as needed. Thereafter, the finished molded pots may be inspected, packed and prepared for delivery to the customer.

In a preferred embodiment, the wall thickness of the molded pot may be at least 0.065 inches, and preferably at least 0.125 inches but can range up to 0.5 inches.

While the present invention has been described in the context of manufacturing molded seed pots, it should be kept in mind that the separated fiber material may be used to form flat flexible paperboard products which can be used for weed control in vegetable farming, landscaping, Christmas tree farming, and horticultural farming.

It is apparent that there has been provided in accordance with the present invention agricultural products developed from manure which fully satisfy the objects, means, and advantages set forth hereinbefore. While the present invention has been described in the context of specific embodiments thereof, other alternatives, modifications, and variations will become apparent to those skilled in the art having read the foregoing description. Accordingly, it is intended to embrace those alternatives, modifications, and variations as fall within the broad scope of the appended claims.

What is claimed is:

1. A process for developing agricultural products from manure comprises the steps of:
    collecting said manure;
    modifying nutrient content and fiber content of said manure without using earthworms;
    preparing a portion of said manure for molding; and
    pulp molding said manure portion into a molded pulp seed pot.

2. A process according to claim 1, further comprising subjecting said molded pulp seed pot to a drying step.

3. A process according to claim 2, wherein said drying step comprises placing said molded pulp seed pot into a drying oven and subjecting said molded pulp seed pot to a temperature and for a time duration sufficient to finish the molded pulp seed pot.

4. The process according to claim 1, wherein said preparing step comprises forming a pulp containing no more than 20 wt % of a material selected from the group of news print and corrugated cardboard and the remainder digested manure fiber.

5. A process for developing agricultural products from manure comprising the steps of:
    collecting said manure;
    modifying nutrient content and fiber content of said manure without using earthworms;

separating at least part of a solid portion of said manure containing nutrients and fibers from a liquid portion;

preparing a portion of said manure for molding after said separating step; and pulp molding said manure portion into a seed pot.

6. A process according to claim 5, wherein said pulp molding step comprises molding said separated part of said solid portion into a bio-degradabe seed pot with manure nutrients in a soluble state.

7. A process according to claim 5, wherein said pulp molding step comprises pulp molding said separated part of said solid portion into a single ply product.

8. A process according to claim 5, wherein said pulp molding step comprises pulp molding said separated part of said solid portion into a multiple ply product.

9. A process according to claim 5, wherein said separating step comprises separating at least part of the solid content from the liquid content using a mechanical separator.

10. A process according to claim 5, wherein said molding preparation process comprises subjecting said separated solid portion to a pulping process.

11. A process according to claim 10, wherein said pulp molding step comprises placing said separated solid portion in pulp form into a mold which enables water to be removed as the seed pot is being formed.

12. A process according to claim 11, wherein said pulp molding step further comprises providing a fine screen and using said fine screen to give each molded seed pot a semi-smooth finish on an exterior surface.

13. A process for developing agricultural products from manure comprising the steps of:

collecting said manure;

modifying nutrient content and fiber content of said manure without using earthworms;

preparing a portion of said manure for molding;

pulp molding said manure portion into a desired product; and wherein said nutrient and fiber modification step comprises subjecting said manure to an anaerobic process.

14. A process according to claim 13, wherein said anaerobic processing step comprises placing said collected manure into an anaerobic digester, digesting said collected manure, and collecting methane gas.

15. A process according to claim 13, wherein said anaerobic processing step comprises placing said collected manure into a continuous plug-flow anaerobic digester and digesting said collected manure.

16. A process according to claim 13, wherein said anaerobic processing step further comprises maintaining said manure in said digester for a time period in the range of 5 to 60 days.

17. A process according to claim 13, wherein said anaerobic processing step comprises maintaining the temperature of said manure on a mesophilic range by burning captured methane gas.

18. A process for developing agricultural products from manure comprising the steps of:

collecting said manure;

modifying nutrient content and fiber content of said manure;

preparing a portion of said manure for molding;

molding said manure portion into a desired product;

wherein said nutrient and fiber modification step comprises subjecting said manure to an anaerobic processing process;

wherein said anaerobic processing step comprises maintaining the temperature of said manure in a mesophilic range by burning captured methane gas; and said anaerobic processing step further comprises maintaining pH in the range of 7.0 to 7.4 and maintaining a carbon/nitrogen ratio in the range of 20:1 to 30:1.

19. A process according to claim 18, wherein said maintaining step further comprises adding a material selected from the group of bicarbonate of soda and hydrated lime.

20. A process for developing agricultural products from manure comprising the steps of:

collecting said manure;

modifying nutrient content and fiber content of said manure without using earthworms;

passing dewatered solid material through a composter to change fiber characteristics in the solid material;

preparing a portion of said manure for molding; and pulp molding said manure portion into a desired product.

* * * * *

UNITED STATES PATENT AND TRADEMARK OFFICE
CERTIFICATE OF CORRECTION

PATENT NO. : 7,594,356 B2 Page 1 of 1
APPLICATION NO. : 10/867228
DATED : September 29, 2009
INVENTOR(S) : Freund et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 75 days.

Signed and Sealed this

Twenty-eighth Day of September, 2010

David J. Kappos
*Director of the United States Patent and Trademark Office*